United States Patent [19]

Funabiki et al.

[11] 4,290,928
[45] Sep. 22, 1981

[54] BINDER FOR DRY HOT COAT FOUNDRY PROCESS

[75] Inventors: Kyohei Funabiki; Noriaki Matsushima; Naomitsu Inouye, all of Fujieda, Japan

[73] Assignee: Sumitomo Durez Company, Ltd., Tokyo, Japan

[21] Appl. No.: 132,599

[22] Filed: Mar. 21, 1980

Related U.S. Application Data

[62] Division of Ser. No. 865,558, Dec. 29, 1977, Pat. No. 4,196,114.

[30] Foreign Application Priority Data

Aug. 4, 1977 [JP] Japan ................. 52/90950

[51] Int. Cl.³ ............................................. C08L 61/10
[52] U.S. Cl. ................... 260/28 P; 164/526; 260/38; 427/221
[58] Field of Search ............... 260/28 P, DIG. 40, 38; 164/43; 427/221; 106/38.2

[56] References Cited

U.S. PATENT DOCUMENTS

| 2,632,745 | 3/1953 | Smith et al. | 260/28 P |
|---|---|---|---|
| 2,878,539 | 3/1959 | Halpern et al. | 260/DIG. 40 |
| 2,923,989 | 2/1960 | Thomson | 260/DIG. 40 |
| 2,934,511 | 4/1960 | Auerbach et al. | 260/28 P |
| 2,943,068 | 6/1960 | Freedman | 260/DIG. 40 |
| 3,734,936 | 5/1973 | Brown | 260/DIG. 40 |
| 3,917,555 | 11/1975 | Worschech et al. | 260/38 |
| 3,944,514 | 3/1976 | Nishiyama et al. | 260/38 |
| 4,073,761 | 2/1978 | Bowman | 260/DIG. 40 |
| 4,196,114 | 4/1980 | Funabiki et al. | 260/28 P |

*Primary Examiner*—Lorenzo B. Hayes
*Attorney, Agent, or Firm*—James F. Mudd; David A. Stein

[57] ABSTRACT

A lubricant-containing binder for the dry hot coat foundry method comprising a solid resol type phenolic resin and a lubricant in an amount of about 0.5 to 10 percent by weight with respect to said phenolic resin.

17 Claims, No Drawings

BINDER FOR DRY HOT COAT FOUNDRY PROCESS

This is a division, of application Ser. No. 865,558, filed Dec. 29, 1977, now U.S. Pat. No. 4,196,114, issued Apr. 1, 1980.

BACKGROUND OF THE INVENTION

The present invention relates to a binder for the dry hot coat foundry method essentially consisting of a solid resol type phenolic resin and to a process for producing resin-coated sand for use in the shell mold foundry process.

The resin-coated sand by dry hot coat method has conventionally been prepared by mixing heated sand with a novolac type phenolic resin (hereinafter referred to simply as novolac), then adding hexamethylenetetramine (hereinafter referred to as hexamine) as hardener in an amount of 10–15% by weight with respect to said resin in a state of aqueous solution under agitation, and further adding calcium stearate. Although such resin-coated sand prepared with novolac-hexamine is advantageous because of its fast hardening speed and fluidity, the hexamine employed in this method is decomposed by heat at the mold forming or metal casting processes to generate nitrogen compounds such as ammonia which eventually give rise to ecological pollution. Also, which, when such sand is utilized in the iron or steel casting, it gives rise to defects in the products such as pinholes or blowholes.

In order to reduce the above-mentioned drawbacks there have been made the following attempts to employ a binder completely free or almost free from nitrogen in the dry hot coat method.

(1) There has been proposed the use, as the hardening agent for the novolac, of a resol type phenolic resin, for example a liquid resol phenolic resin prepared with an alkali metal catalyst. This method, however, has a drawback of requiring a prolonged blending, and also the prepared resin-coated sand shows such defects as caking and peel-back at the mold forming. There has also been proposed the use, as another hardening agent, of a solid resol type phenolic resin prepared with ammonia catalyst (hereinafter referred to as solid ammonia resol), which however is associated with a serious drawback of a slow hardening speed:

(2) Some years ago there was proposed the use of a solid resol type phenolic resin (hereinafter referred to as solid resol) alone as the binder for use in the dry hot coat method. This method is disadvantageous in that the resin composition, though being provided with a slower hardening speed than in the case with novolac-hexamine, shows local hardening in the blending operation before the sand particles can be satisfactorily coated, thus resulting in an insufficient fluidity while hot. As a result, the shell mold prepared by resin-coated sand has an extremely low strength which could not be employed in practical use. This method, however, has been given consideration again because of the recent concern for the above-mentioned gas defects such as pinholes or blowholes and for ecological problems caused by the disagreeable odor at the mold forming or metal casting, both associated with the use of hexamine.

In order to improve the hardening speed, there have been proposals to control the reaction of solid ammonia resol and extract the solid ammonia resol in an earlier stage of reaction. Such solid ammonia resol, though realizable in a laboratory experiment, is difficult to obtain in uniform quality in a mass scale production due to the inevitable difficulty encountered in reaction control. Moreover the fluidity of sand while hot is still deficient with such solid ammonia resol, and the obtained mold therefrom is poor in strength. Also the solid ammonia resol prepared in this manner gives rise to another new drawback of caking of sand particles as the melting point of binder is inevitably lowered.

For the purpose of improving the hardening speed there has also been proposed the addition of a hardening accelerator such as resorcin, which however, constitutes a source of another disagreeable odor and still does not provide a fundamental improvement in the insufficient strength resulting from lack of sufficient fluidity while hot.

SUMMARY OF THE INVENTION

One object of the present invention, therefore, is to provide a highly reactive binder which allows easy manufacture of solid resol adapted for use in the dry hot coat method and free from caking of sand particles.

Another object of the present invention is to provide resin-coated sand provided with satisfactory strength resulting from sufficient fluidity while hot and a fast hardening property by the use of a solid resol containing lubricant therein (hereinafter referred to as lubricant-containing binder) in the dry hot coat method.

And still another object of the present invention is to provide resin-coated sand capable of reducing the gas defects and ecological pollution by the use of solid resol with an essentially reduced nitrogen content.

The lubricant-containing binder characterized by the present invention is a solid resol containing a lubricant and consisting of a resin obtained by reacting one mole or more of formaldehyde with one mole of phenols in the presence of an alkali catalyst. Said solid resol itself can be solid resol prepared with ammonia catalyst or an amine catalyst such as an amine compound, a solid resol prepared with the simultaneous use of an amine catalyst and an alkali metal catalyst, or a solid resol prepared with an alkali metal catalyst.

The phenols to be employed in the present invention include phenol, alkylphenols such as m-cresol, p-cresol or xylenol, and the mixtures thereof.

The formaldehyde to be employed in the present invention includes formalin, formaldehyde polymers such as a paraformaldehyde or trioxane, and mixtures thereof. Also hexamine is usable as a catalyst and also as a part of formaldehyde source.

The examples of amine catalyst employable in the present invention are monomethylamine, triethylamine, ethanolamine and aniline.

The examples of alkali metal catalyst employable in the present invention are hydroxides and oxides of an alkali metal such as sodium, potassium or lithium, and hydroxides and oxides of alkali earth metal such as barium, calcium or magnesium.

The examples of said lubricant are Carnauba wax, Montana wax, paraffin wax, polyethylene wax, aliphatic acid amides such as ethylene bis-stearyl amide, methylene bis-stearyl amide, oxystearyl amide, stearyl amide or linoleyl amide, aliphatic acid salts such as calcium stearate, preferably ethylene bis-stearyl amide, methylene stearyl amide, oxystearyl amide, stearyl amide or polyethylene wax.

For the purpose of obtaining a lubricant-containing binder, said lubricant may be added before, during or after the reaction to prepare solid resol. For realizing uniform dispersion of the lubricant, it is preferably done before or during the reaction and in the form of a dispersion. The amount of said lubricant is within a range from 0.5 to 10 wt.% with respect to the targeted amount of solid resol, preferably within a range from 1 to 7 wt.% in consideration of the balance between the fluidity while hot, hardening speed and strength.

The lubricant-containing binder of the present invention can be prepared in the following manner:

(1) Phenol in an amount of 1 mole and formaldehyde in an amount of 1–3 moles are charged in a reactor, adding an alkali catalyst, eventually a lubricant, and subjected to condensation reaction at 50°–100° C. for about 30 minutes to 2 hours. The addition of lubricant is preferably conducted after said condensation reaction or during the succeeding dehydration step. Successively the reaction mixture is subjected to dehydration under reduced pressure and at a temperature not exceeding 100° C. to eliminate water from the condensate thereby obtaining a highly viscous yellow or yellowish brown transparent reaction product. The addition of lubricant may also be effected at this point if desired. The reaction product thus obtained is taken out from the reactor, rapidly cooled and crushed to obtain the lubricant-containing binder of desired size.

(2) Phenol in an amount of 1 mole and formaldehyde in an amount of 1–3 moles are charged in a reactor, adding thereto an alkali catalyst and subjected to condensation reaction of 50°–100° C. for about 30 minutes to 2 hours. To the reaction mixture is then added a dispersion of lubricant and a silane coupling agent such as aminosilane or epoxysilane and subjected to rapid drying to obtain the lubricant-containing binder in flake or granular shape.

(3) The lubricant-containing binder can also be obtained by incorporating a lubricant into a solid resol modified with a modifier such as resorcin, urea, melamine, cashew nut shell oil or xylene formaldehyde resin capable of reacting with formaldehyde.

In the foregoing process (1) or (2), the alkali catalyst may be added portionwise before and during the reaction.

According to the present invention, the resin-coated sand for shell mold can be produced with the dry hot coat method, utilizing a muller and methods of conventional process for producing resin-coated sand for shell mold.

According to the present invention, the sand preheated to 120–140° C. is charged in a muller, then is mulled for approximately 1 minute with a lubricant-containing solid resol in an amount of 2–3 wt.% with respect to the amount of sand, then further mulled after addition of cooling water in an amount of 1–2 wt.% with respect to sand until the sand lumps are crushed, and to this is eventually added a small amount of calcium stearate if necessary to obtain the resin-coated sand for shell mold.

The lubricant-containing binder of the present invention and the resin-coated sand obtained therefrom are not only provided with the advantages of none of disagreeable odor or of no gas defects in the cast products, and of improved stability during storage in comparison with the case of using liquid resol, but also provide the following additional advantages:

(1) The lubricant-containing binder of the present invention is provided with improved resistance against blocking due to the higher apparent melting point achieved by the presence of lubricant, in comparison with the conventional solid resol. The absence of the caking problem allows the resin to be obtained in a very early reaction stage, with increased methylol content, which in turn provides a fast hardening speed and allows the user to obtain a resin-coated sand mold with higher strength due to better crosslinking and reduced peel-back tendency.

(2) The presence of the lubricant in the solid resol facilitates the control of reaction at the manufacture of resin, thus providing a resin with stable quality.

(3) The uniform distribution of lubricant in the solid resol improves the fluidity of hot resin and thus improves the wetting of sand particles, thereby providing a stronger coating thereon.

(4) The mulling operation for preparing resin-coated sand is rendered simpler as the addition of calcium stearate can be dispensed with or suffice with a small amount.

For further satisfactory embodiment of the present invention, the hardening speed can be increased by the combined use of ammonia and an alkali metal as reaction catalyst. Also preferred, for improving the resistance against moisture, is the use of a silane coupling agent.

DESCRIPTION OF THE PREFERRED EMBODIMENTS

Now the present invention will be further clarified by the following non-limitative examples. Throughout this specification and claims, wherein the amounts and percentages are represented in parts by weight and percent by weight and temperatures are in degrees Centigrade, unless otherwise specified.

EXAMPLE 1

2000 parts of phenol and 2590 parts of 37% formalin were placed in a reactor equipped with a condenser, then to this was added 160 parts of 28% aqueous solution of ammonia and gradually heated. The mixture was reacted under reflux for 30 minutes after the temperature reached 100° C., then 80 parts of methylene bis-stearyl amide added which was well dispersed in the reaction mixture, and subjected to dehydration under a reduced pressure of 30–50 cm Hg. Then the internal temperature reached 85° C., the reaction product was taken out from the reactor, rapidly cooled by spreading on the floor and crushed to obtain 2190 parts of lubricant-containing binder particles.

EXAMPLE 2

2000 parts of phenol and 2590 parts of 37% formalin were placed in a reactor equipped with a condenser, then 160 parts of 28% aqueous solution of ammonia and 60 parts of 50% aqueous solution of sodium hydroxide were added and gradually heated. The mixture was reacted under reflux for 30 minutes after the temperature reached 100° C., then 80 parts of ethylene bis-stearyl amide was added which was well dispersed in the reaction mixture, and subjected to dehydration under vacuum. When the internal temperature reached 85° C., the reaction product was taken out from the reactor, rapidly cooled and crushed to obtain 2200 parts of lubricant-containing binder particles.

EXAMPLE 3

The process of Example 1 was reproduced except that the lubricant was replaced by 250 parts of aqueous dispersion of polyethylene wax (an aqueous dispersion with a solid content of 40 wt.% of polyethylene wax with an average molecular weight of 16,000 dispersed with sodium dodecylbenzene sulfonate) to obtain 2220 parts of lubricant-containing binder particles.

EXAMPLE 4

The process of Example 1 was reproduced except that 10 parts of aminosilane A-1100 (produced by Nippon Unicar) was further added when the internal temperature reached 80° C. in the course of dehydration under reduced pressure to obtain 2200 parts of lubricant-containing binder in particles.

EXAMPLE 5

2000 parts of phenol and 2420 parts of 37% formalin were placed in a reactor, then 160 parts of 28% aqueous solution of ammonia was added and gradually heated. The mixture was reacted under reflux for 30 minutes after the temperature reached 100° C., then 80 parts of methylene bis-stearyl amide which was well dispersed in the reaction mixture was added, and subjected to dehydration under a reduced pressure of 30–51 cm Hg. When the internal temperature reached 85° C., the reaction product was taken out from the reactor, rapidly cooled by spreading on the floor, and crushed to obtain 2170 parts of lubricant-containing binder particles.

EXAMPLE 6

2000 parts of phenol and 2760 parts of 37% formalin were placed in a reactor, then 160 parts of 28% aqueous solution of ammionia was added and gradually heated. The mixture was reacted under reflux for 30 minutes after the temperature reached 100° C., then 90 parts of ethylene bis-stearyl amide was added and was well dispersed in the reaction mixture, and subjected to dehydration under a reduced pressure of 30–50 cm Hg. When the internal temperature reached 85° C., the reaction product was taken out from the reactor, cooled rapidly by spreading on the floor and crushed to obtain 2220 parts of lubricant-containing binder particles.

EXAMPLE 7

2000 parts of phenol and 2760 parts of 37% formalin were placed in a reactor, then 160 parts of 28% aqueous solution of ammonia and 60 parts of 50% aqueous solution of sodium hydroxide were added, and gradually heated. The mixture was reacted under reflux for +minutes after the temperature reached 100° C., then 90 parts of ethylene bis-stearyl amide as a lubricant was added and was well dispersed in the reaction mixture, and subjected to dehydration under a reduced pressure of 30–50 cm Hg. When the internal temperature reached 85° C., the reaction product was taken out from the reactor, rapidly cooled and crushed to obtain 2250 parts of lubricant-containing binder particles.

EXAMPLE 8

The process of Example 7 was reproduced except that the lubricant was replaced by 250 parts of an aqueous dispersion of polyethylene wax (an aqueous dispersion with a solid content of 40% of polyethylene with an average molecular weight of 16,000 emulsified with sodium dodecylbenzene sulfonate) and that 37% formalin was employed in an amount of 3450 parts to obtain 2280 parts of lubricant-containing binder particles.

EXAMPLE 9

The process of Example 7 was reproduced except that 10 parts of aminosilane A-1100 (produced by Nippon Unicar) was also added when the internal temperature reached 80° C. in the course of dehydration under reduced pressure to obtain 2255 parts of lubricant-containing binder particles.

CONTROL EXAMPLE A 2000 parts of phenol and 2590 parts of 37% formalin were placed in a reactor, then 160 parts of 28% aqueous solution of ammonia was added and gradually heated. The mixture was reacted under reflux for 30 minutes after the temperature reached 100° C., and subjected to dehydration under a reduced pressure of 30–50 cm Hg. When the internal temperature reached 95° C., the reaction product was taken out from the reactor, rapidly cooled by spreading on the floor, and crushed to obtain 2120 parts of solid resol particles.

CONTROL EXAMPLE B

The process of Control Example A was reproduced except that the reaction product was taken out from the reactor and cooled rapidly when the internal temperature reached 85° C., to obtain 2130 parts of solid resol particles.

CONTROL EXAMPLE C 60 parts of methylene bis-stearyl amide was added to 2000 parts of solid resol particles obtained in Control Example B, to obtain solid resol particles covered with the lubricant.

CONTROL EXAMPLE D

The process of Control Example A was reproduced except that 37% formalin was employed in an amount of 2760 parts, to obtain 2160 parts of solid resol particles.

The properties of the solid resol resin obtained in the foregoing examples and control examples are summarized in the following Tab. 1.

TABLE 1

| Binder | Melting Point (°C.) | Resin Caking |
|---|---|---|
| Example 1 | 97 | + |
| Example 2 | 97 | + |
| Example 3 | 95 | + |
| Example 4 | 96 | + |
| Example 5 | 96 | + |
| Example 6 | 98 | + |
| Example 7 | 98 | + |
| Example 8 | 97 | + |
| Example 9 | 98 | + |
| Control Example A | 85 | ± |
| Control Example B | 75 | − |
| Control Example C | not constant | ± |
| Control Example D | 83 | ± |

Test Methods

| | |
|---|---|
| Melting Point | According to JACT test method RS-1. |
| Resin Caking | 15 kgs. of a lubricant-containing binder or a solid resol as crushed particles is packed in a polyethylene-lined kraft paper bag and placed under a load of 200 kgs. at 30° C. |
| − | caking within one day |
| ± | caking within five days |
| + | no caking over 30 days |

The binders or resins obtained in the foregoing examples or control examples were used for the preparation of resin coated sands in the following manner.

"Ayaragi" silicate sand preheated to 130°–140° C. was charged in a Wahl mixer, and blended with a solid resol in an amount of 3% with respect to sand for 40 seconds. Then cooling water in an amount of 1.5% with respect to sand was added, and the blending was continued until the lumps of coated sand were crushed. The sand was further blended for 20 seconds after the addition of calcium stearate in an amount of 0.05% with respect to the sand, then taken out from the mixer and subjected to aeration to obtain the resin-coated sand, which properties are summarized in the Tab. 2.

The properties of resin-coated sand shown in Tab. 2 were determined in the following manner:

| | |
|---|---|
| Bending strength (Kg/cm$^2$) | According to JACT test method SM-1. |
| Stick point (°C.) | According to JACT test method C-1. |
| Hot tensile strength (Kg/cm$^2$) | According to JACT test method SM-10. |
| Aging of coated sand | Resin-coated sand was packed and sealed in a polyethylene bag immediately after the preparation, and subjected to the measurement of bending strength (Kg/cm$^2$) by molded specimens after storage for 30 days at room temperature. |

The coating of sand in Control Example D was the same as the above-mentioned preparations of resin-coated sand with solid resol except that the solid resin was novolac-hexamine, the latter employed in an amount of 15% with respect to novolac and added after dissolving in cold water, and that calcium stearate was added in an amount of 0.1% with respect to the silicate sand.

TABLE 2

Properties of Resin-Coated Sand

| | Bending Strength (Kg/cm$^2$) | Stick Point (°C.) | Hot Tensile Strength (Kg/cm$^2$) | | | Aging of: Coated Sand, Bending Strength (Kg/cm$^2$) |
|---|---|---|---|---|---|---|
| | | | 30 sec. | 60 sec. | 240 sec. | |
| Example 1 | 45.8 | 102 | 2.4 | 7.7 | 20.1 | 41.9 |
| Example 2 | 45.1 | 101 | 3.6 | 9.8 | 19.5 | 40.6 |
| Example 3 | 42.6 | 101 | 2.0 | 6.5 | 19.8 | 38.1 |
| Example 4 | 47.4 | 103 | 2.1 | 6.9 | 22.5 | 45.6 |
| Example 5 | 46.2 | 101 | 1.9 | 6.9 | 18.8 | 41.0 |
| Example 6 | 44.3 | 104 | 2.9 | 8.3 | 19.5 | 43.6 |
| Example 7 | 45.0 | 103 | 3.7 | 10.0 | 19.1 | 40.4 |
| Example 8 | 41.6 | 101 | 3.2 | 9.6 | 18.3 | 37.0 |
| Example 9 | 45.9 | 103 | 3.4 | 9.7 | 19.5 | 43.6 |
| Control Ex. A | 32.1 | 103 | 1.2 | 5.7 | 17.6 | 28.3 |
| Control Ex. B | | | not usable | | | |
| Control Ex. C | 38.8 | 102 | 1.8 | 6.2 | 18.6 | 34.7 |
| Control Ex. D | 30.7 | 105 | 1.5 | 6.6 | 16.9 | 27.5 |
| Control Ex. E | 45.9 | 105 | 2.4 | 7.3 | 21.3 | 42.2 |

What is claimed is:

1. A lubricant-containing binder for the dry hot coat foundry method consisting essentially of a solid resol-type phenolic resin produced by the reaction comprising condensation of reactants consisting of a phenol and a formaldehyde source followed by dehydration of the reaction mixture, and a lubricant in an amount of about 0.5 to 10 percent by weight with respect to said phenolic resin, wherein said lubricant is added prior to or during the course of the reaction to produce said solid resol-type phenolic resin.

2. A binder according to claim 1 wherein said lubricant is added after the condensation step but before the dehydration step of the reaction to produce the resol-type phenolic resin.

3. A binder according to claim 2 comprising said lubricant in an amount of about 1 to 7 percent by weight with respect to said solid resol-type phenolic resin.

4. A binder according to claim 4 wherein said lubricant is added and melted during the course of reaction of said solid resol-type phenolic resin.

5. A binder according to claim 5 wherein said lubricant is a dispersion.

6. A binder according to claim 5 wherein said lubricant is ethylene bis-stearyl amide, methylene bis-stearyl amide, oxystearyl amide or stearyl amide.

7. A binder according to claim 6 wherein said lubricant is polyethylene wax.

8. A binder according to claim 7 wherein the reaction catalyst for said resol-type phenolic resin is an amine catalyst.

9. A binder according to claim 8 wherein the reaction catalyst for said solid resol-type phenolic resin is a combination of an amine catalyst and an alkali metal catalyst.

10. A binder according to claim 9 wherein a silane coupling agent is added to said solid resol-type phenolic resin.

11. A process for producing resin-coated sand for use in a shell mold which comprises coating heated sand particles with a lubricant containing binder comprising a solid resol-type phenolic resin produced by the reaction comprising condensation of reactants consisting of a phenol and a formaldehyde source followed by dehydration of the reaction mixture, and a lubricant in an amount of about 0.5 to 10 percent by weight with respect to said phenolic resin, wherein said lubricant is added after the condensation step, but before the dehydration step of the reaction to produce said solid resol-type phenolic resin.

12. A process for producing resin-coated sand according to claim 11 wherein said lubricant-containing solid resol-type phenolic resin is prepared by adding a dispersion of a lubricant after the condensation step, but before the dehydration step, of the reaction to produce said resol-type phenolic resin.

13. A process for producing resin-coated sand according to claim 12 wherein said lubricant is ethylene bis-stearyl amide, methylene bis-stearyl amide, oxystearyl amide or stearyl amide.

14. A process for producing resin-coated sand according to claim 12 wherein said lubricant is polyethylene wax.

15. A process for producing resin-coated sand according to claim 14 wherein said lubricant is employed in an amount of about 0.5 to 10 percent by weight with respect to said solid resol-type phenolic resin.

16. A process for producing resin-coated sand according to claim 15 wherein the reaction catalyst for said lubricant-containing solid resol-type phenolic resin is a combination of an amine catalyst and an alkali metal catalyst.

17. A foundry sand composition produced by the process of claim 11.

* * * * *